United States Patent
Williams (10) Patent No.: US 7,139,920 B2
(45) Date of Patent: Nov. 21, 2006

(54) METHOD AND APPARATUS FOR SUPPLYING POWER IN ELECTRONIC EQUIPMENT

(75) Inventor: Emrys J. Williams, Milton Keynes (GB)

(73) Assignee: Sun Microsystems, Inc., Santa Clara, CA (US)

(*) Notice: Subject to any disclaimer, the term of this patent is extended or adjusted under 35 U.S.C. 154(b) by 437 days.

(21) Appl. No.: 10/387,784

(22) Filed: Mar. 13, 2003

(65) Prior Publication Data

US 2004/0181698 A1    Sep. 16, 2004

(51) Int. Cl.
G06F 1/26 (2006.01)
G05F 1/10 (2006.01)

(52) U.S. Cl. .................. 713/300; 323/234; 361/139

(58) Field of Classification Search ............. 713/300, 713/320, 324, 340; 323/234; 361/139
See application file for complete search history.

(56) References Cited

U.S. PATENT DOCUMENTS

| | | | | |
|---|---|---|---|---|
| 4,272,717 A * | 6/1981 | Bailey | ......................... | 323/226 |
| 4,933,829 A * | 6/1990 | White | | |
| 5,584,031 A * | 12/1996 | Burch et al. | | |
| 5,648,759 A * | 7/1997 | Miller et al. | ................. | 340/660 |
| 5,825,674 A * | 10/1998 | Jackson | | |
| 5,986,902 A * | 11/1999 | Brkovic et al. | ................. | 363/50 |
| 6,157,008 A | 12/2000 | Brown et al. | | |
| 6,266,220 B1 * | 7/2001 | Lahoud | .......................... | 361/58 |
| 6,463,396 B1 * | 10/2002 | Nishigaki | .................... | 702/132 |
| 6,473,608 B1 * | 10/2002 | Lehr et al. | .................... | 455/402 |
| 6,534,933 B1 * | 3/2003 | Shen | ........................... | 315/307 |
| 2001/0003207 A1 * | 6/2001 | Kling et al. | ................. | 713/320 |
| 2005/0081073 A1 * | 4/2005 | Williams et al. | | |

FOREIGN PATENT DOCUMENTS

| | | | |
|---|---|---|---|
| GB | 2 260 233 | | 4/1993 |
| GB | 2 361 326 | | 10/2001 |
| JP | 2000330673 | | 11/2000 |
| JP | 2001034370 | | 2/2001 |
| WO | 92/10032 | * | 6/1992 |
| WO | 98/38734 | | 9/1998 |

OTHER PUBLICATIONS

H.D.L. Hollman, et al., "Protection of Software Algorithms Executed on Secure Modules," Future Generation Computer Systems 13, Elsevier Science B.V., 1997, pp. 55-63.*

* cited by examiner

Primary Examiner—Thomas Lee
Assistant Examiner—Mark Connolly
(74) Attorney, Agent, or Firm—Robert C. Kowert; Meyertons, Hood, Kivlin, Kowert & Goetzel, P.C.

(57) ABSTRACT

A method and apparatus are disclosed for supplying power in electronic equipment. Thus the apparatus comprises at least one electronic component and a power supply unit that provides power to the electronic component. The power supply unit incorporates a detector that is responsive to the power output level from the power supply unit increasing beyond a predetermined limit. If this limit is breached, the power supply unit outputs a delay signal to the electronic component. This delay signal then causes the electronic component to reduce its power consumption (such as by performing dummy operations), thereby avoiding an overload on the power supply unit.

36 Claims, 4 Drawing Sheets

METHOD AND APPARATUS FOR SUPPLYING POWER IN ELECTRONIC EQUIPMENT

FIELD OF THE INVENTION

The present invention relates to power supplies in electronic equipment such as computers, and in particular to allowing such power supplies to better cope with variations in power demand.

BACKGROUND OF THE INVENTION

Figure 1:
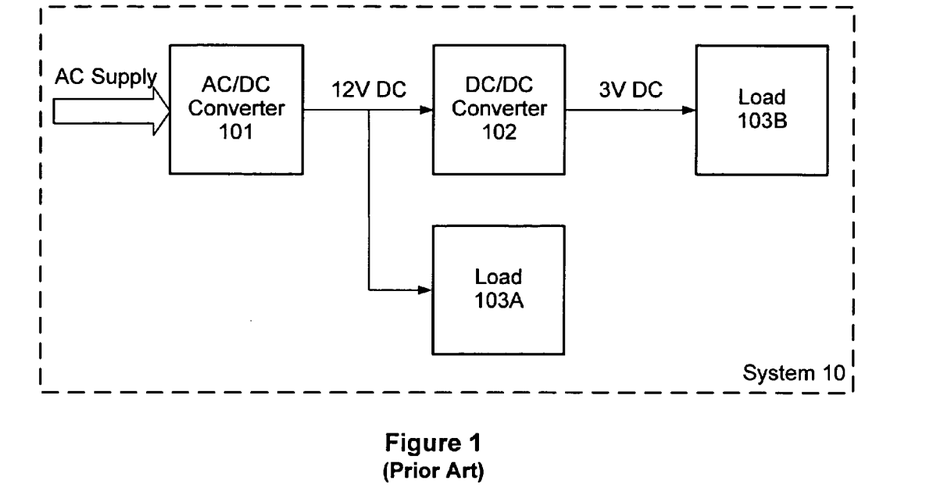
FIG. 1 is a high-level schematic representation of a power supply configuration in a typical computer system.

FIG. 1 provides a schematic representation of the power supply arrangement in a typical computing device 10. The system receives AC power supply from the mains or other appropriate source. The AC supply is fed into an AC/DC converter 101, which outputs a DC power supply at some intermediate voltage (e.g. 12 Volts). This output is then supplied directly to some of the components within system 10, as illustrated schematically by load 103A in FIG. 1. Typically load 103A comprises various electromechanical devices, such as disk drives, fans, and so on.

System 10 further includes components, depicted schematically in FIG. 1 as load 103B, which require a lower DC voltage than load 103A. Accordingly, system 10 also incorporates a DC/DC converter 102 that converts the 12 Volt output from AC/DC converter 101 to a relatively low voltage DC supply (e.g. 3 Volts). Typically DC/DC converter 102 is located on the motherboard of system 10, and supplies its low voltage output to various digital electronic components on the motherboard, such as a central processing unit (CPU) and dynamic random access memory (DRAM).

It will be appreciated that there are many other known configurations for the power supply within a computing system apart from that shown in FIG. 1. For example, there may be several DC/DC converters 102 in order to provide different voltages for various devices (or alternatively a single converter may support multiple outputs at a range of voltages).

One problem in the design of power supplies for computers is that there can be significant fluctuations in the amount of power that such devices require. This is particularly a problem in relation to digital electronic components. Consider, for example, the operation of RAM. As is well-known, data access to RAM is generally slow compared to the normal processing speed of the CPU, and so most systems are provided with one or more cache units (either inside or adjacent to the CPU). A cache unit contains a subset of the data from RAM, and allows the processor fast access to this subset of data in order to improve performance.

With good hardware and software design, the majority of processor memory accesses are generally satisfied from the cache. In normal operations therefore, perhaps only 10% (for example) of memory accesses from the CPU are cache misses, and so need to be supplied from RAM itself. However, there can be times when the cache hit rate is significantly reduced, such as when a new application is being started up, often with its own initialisation data, or when an unusual data or code structure leads to low cache hit rate. Assuming that in these circumstances the cache hit rate falls to zero, every memory access now goes to RAM. Consequently, the access rate into RAM has increased by a factor of ten compared to the 10% cache miss rate above. This will generally cause the power consumption of the RAM to increase by approximately a corresponding factor of ten.

The system power supply unit, such as DC/DC converter 102 in FIG. 1, therefore needs to be able to accommodate such significant variations in power usage. In particular, the power supply must be able to handle sudden, temporary peaks of demand, where there is a large increase in power consumption compared to the usual requirements. Consequently, power supplies in computer systems typically have a maximum output capacity that significantly exceeds their normal expected operating level. It will be appreciated that this adds considerably to the cost of the power supply.

Unfortunately, it is rather difficult to accurately predict or model the peak power usage of certain digital electronic devices. Thus while the maximum power usage for RAM is expected to occur at zero cache hit rate, for other components the situation is far less clear. One example is a floating-point unit (FPU), which may be integrated into a CPU or provided as a separate add-on chip. Typically the power consumption of the FPU is highly dependent upon the data being processed, but this dependency is very complex and difficult to predict at design time. Accordingly, there is a general tendency to over-specify the power supply requirements for an FPU and analogous devices, in order to provide a safety margin in case the predicted (estimated) power consumption is too low. Again, this over-specification increases costs for the power supply.

Nevertheless, it is difficult to be absolutely confident that the margins provided are indeed adequate, in which case the FPU or other device may be vulnerable to some obscure (pathological) data sequence that causes the power supply to be over-stressed. Typically the power supply will then cut out as a safety precaution (rather than burning out), leading at least to the need for a system reboot, and the possible loss of data as well.

Note that if such a pathological data sequence does exist, but does not become known until after a system has shipped, then it is extremely difficult to protect against it in the field. This is because the offending data sequence would generally appear as a set of standard data processing operations, and so would be very hard to detect specifically in either software or hardware. Furthermore, even if the probability of such a data sequence being used by accident were extremely small, there is the risk that it may be used deliberately, such as by a hacker or terrorist, as part of a malicious attack on the system.

Another concern is that computer systems are typically available in a very wide range of configurations. For example, models in a given product range may vary in terms of processor speed, memory capacity, storage capacity, and so on. Moreover, a model range may evolve over time, as new components (e.g. higher speed processors) become available. Furthermore, customers frequently perform upgrades to installed systems as well, such as by supplementing or replacing existing components with new and more powerful components that were not necessarily available when the system was originally designed and purchased.

As a result, any given system is typically available in, or may be modified to, a very wide range of configurations. It is difficult for a manufacturer to rigorously test every single potential configuration. Instead, particular components (e.g. RAM units) are generally designed to be compatible (i.e. interchangeable) with one another, so that a modification or upgrade of such a component should not take a system outside its proper operating regime, including in terms of the power supply requirements. Nevertheless, there may be some subtle and unexpected differences in the way that slightly different versions of a component perform or interact with other components that do impact power consumption. This in turn might adversely affect system operation and reliability for certain particular configurations.

In summary therefore, existing computer systems tend to have power supplies that are conservatively engineered, and so are rather expensive compared to the demand that is placed on them for normal system operations. Even so, despite the significant safety margins provided, it is difficult to be absolutely certain that there is no pathological combination of operations or potential system reconfiguration that will not overload the power supply, and so lead to a system failure.

SUMMARY OF THE INVENTION

Thus in accordance with one embodiment of the invention, there is provided apparatus comprising one or more electronic components and a power supply unit to provide power to the electronic components. The power supply unit incorporates a detector to detect if the power output level from the power supply unit increases beyond a predetermined limit or threshold. If so, the power supply unit outputs an alert signal to the electronic component(s), which are responsive to this signal to reduce their power consumption. In this manner, the power supply unit can be protected against overload, particularly with respect to any sudden, short-term peaks in power consumption.

For a typical implementation, the electronic components reduce their power consumption by delaying or postponing certain operations. In other words, the relevant operations are spread out in time, which has the effect of smoothing out the peaks in power consumption. This in turn allows a power supply to be designed with a lower maximum capacity, i.e. one closer to its normal operating level, since the power supply no longer has to be able to accommodate such significant variations in power consumption. It will be appreciated that this helps to reduce the cost of the power supply. Furthermore, overall system robustness is improved, in that the protection against surges in power consumption is achieved with minimal disruption to system operation. Thus rather than having a full power cut-out or such-like and the need to subsequently re-boot the system (at least), the above approach allows the components to perform a controlled reduction in their power consumption. Normal processing will nevertheless continue, albeit typically at a slightly reduced rate. The situation will then be transparent to the user, providing of course that any such peaks in power consumption are relatively uncommon, so that the overall impact on system performance is minimal. (It will be appreciated that the intention is primarily to smooth out exceptional peaks in power consumption; the power supply should be able to intrinsically handle those peaks that occur regularly and relatively frequently).

Such a power management facility is particularly useful in conjunction with digital electronic semiconductor load devices, especially those liable to occasional peaks in power consumption, such as a CPU and a DRAM. These are typically located in a computer system, which will therefore benefit particularly from this facility, but nevertheless the approach is potentially applicable to a wide range of electronic systems, including telecommunication apparatus, household electronic goods (televisions, DVD players, etc.), and so on.

Note that the power supply unit may provide power to multiple components, only some of which are responsive to the alert signal. In general, the alert signal is directed to those components whose consumption is subject to fluctuations in power consumption, and whose peak consumption is sufficiently high to represent a significant drain on the power supply. Furthermore, such components must be able to sensibly operate with reduced power consumption, without undermining overall system processing (so that user transparency is maintained).

It will be appreciated that the way in which power consumption is reduced is generally specific to the particular component involved. For example, a CPU may respond to the alert signal by performing dummy operations that are known to take relatively little power, and that do not otherwise alter the state of processor (so that normal processing is not otherwise impacted). Other components may make themselves temporarily unavailable for a requested operation, causing it to be (successfully) retried some time later.

Note that the power supply unit typically also includes an automatic cut-out, which triggers to protect the power supply unit from damage caused by excess power drain. This automatic cut-out is set to occur at a power output level greater than the predetermined limit. More accurately (from a design perspective), the predetermined limit is normally specified at a value substantially below this cut-out point. Thus the automatic cut-out provides a fail-safe or back-up protection facility for the power supply unit. Nevertheless, by providing sufficient margin between the predetermined limit and the cut-out point, it is intended that the use of the alert signal allows those power consumption peaks that would otherwise trigger a cut-out to be smoothed, so that such a cut-out no longer occurs. It will be appreciated that this then allows the system to continue normal processing operations, without the need for a reboot and possible loss of user data.

There are many potential implementations of the alert signal. In one embodiment, it comprises an output signal from the power supply that is changed from a first value to a second value in response to the power output level increasing beyond the predetermined limit. Typically this is done by having a single (i.e. binary) line, wherein the first value represents the quiescent state (say 0), and the second value represents the active state (say 1). In other words, this line is asserted to flag or indicate that power consumption needs to be reduced.

In other embodiments, a more complex alert signal may be utilised. For example, the signal may comprise multiple bits, and is then set to one of a plurality of values according to the current power output level. Thus for a two-bit output, 00 might represent normal operations (i.e. power consumption at a satisfactory level), while outputs 01, 10 and 11 can then be used to signal increasing levels of alert. The electronic components then reduce their power consumption according to the indicated level of alert (i.e. an output of 1 causes the maximum possible amount of reduction in power consumption). Another possibility is that the alert signal is directed to an increasing number of load devices as the detected power consumption rises.

In some implementations, the amount of reduction may also be based on the present usage of the component in question. For example, a component that is experiencing a peak in power consumption may respond to the alert signal by reducing its power consumption, whereas a component that presently has a relatively low level of consumption (e.g. below a particular threshold) may continue its normal processing despite the alert signal. This approach typically requires some ability to determine the power consumption of the components (this facility can either be within or external to the components themselves).

It will be appreciated that the power supply unit resets or releases the alert signal when the power consumption falls back again to an easily accommodated level. For example, if the alert signal is on a binary line, then this is no longer asserted (i.e. the line returns from its active state to its quiescent state). In one embodiment this occurs when the power output level drops back down below the predetermined limit. However, the release threshold for the alert signal could be set to a different value from the initial trigger threshold, and/or there may be some delay after the threshold is passed before actually releasing the alert signal. Typically such parameters are set to try to ensure that the average power consumption is kept within a level that can be safely accommodated by the power supply unit. For example, increasing the delay can help to reduce peak levels of power consumption. The skilled person will be aware of various techniques and criteria for setting the reset parameters appropriately, and according to the particular implementation (e.g. whether the alert signal comprises one or more bits).

In a typical implementation, the alert signal is provided over a different connection from the power supply itself. In other words, a first line is used to provide power from the power supply unit to an electronic component, and a second line to provide the alert signal from the power supply unit. However, it may also be possible to provide them on the same line, for example by having the alert signal as some form of high frequency modulation of the power signal.

In some implementations, and for some electronic load components, the alert signal may be routed via a control unit. The control unit is then responsive to receipt of the alert signal to cause one or more associated electronic components to reduce their power consumption. For example, if the power consumption of certain DRAM units needs to be managed, then a control unit could be provided to receive the alert signal, and to send the appropriate commands and instructions to the DRAM units to reduce their power consumption. Note such commands or instructions may already exist for other purposes such as testing (e.g. perhaps a command to hold a component in a temporarily unresponsive state). In this case the interposition of the control unit between the power supply and the component(s) allows the power regulation facility described herein to be utilised with components that were not originally designed to provide support for this functionality.

Note that the control unit may be integrated into an existing device. For example, for DRAM units the control unit may be integrated into their associated memory controller. Alternatively, the alert signal may be routed directly into a load device that is able to then reduce its power consumption accordingly (in which case the controlled unit may be omitted or bypassed). This will typically be the case for components that have relatively more (machine) intelligence, such as a CPU, or that have been specially designed to support this power regulation facility.

In a typical embodiment, the power supply includes an output capacitor to provide charge storage capacity. One rationale for this is that the electronic components may operate on a significantly faster timescale than the power supply detector. The capacitor is therefore sufficiently large to allow it to satisfy a peak in power consumption until the alert signal can be generated and the subsequent power output smoothing process take effect. It will be appreciated that this sizing depends primarily on the time response of the detector, and also on a maximum anticipated power consumption level of the electronic components.

In one implementation, the power supply is of the switching regulator type, in which the output level is controlled by the duty cycle of a FET that is repeatedly switched on and off. In this implementation, the detector measures the duty cycle to determine whether the power output has increased beyond the predetermined limit. In other words, if the FET is in the ON state for more than a predefined proportion of the switching cycle, then the alert signal is triggered. It will appreciated however that any other suitable parameter may be monitored by the detector in order to assess the output power level, depending on the particular power supply design. For example, the alert signal may be triggered by a rise in output current, or perhaps a fall in output voltage (if this reflects an increase in power output).

Note also that if the power supply unit further incorporates an automatic cutoff, such as discussed above, then the mechanism for this may be quite separate from that used to generate an alert signal. For example, in a switching regulator power supply unit, the alert signal may be based on the FET duty cycle, while the automatic cut-off may trigger based on output current.

In accordance with other embodiments of the invention, a power supply unit and an electronic component suitable for use in such apparatus are provided. More particularly, one embodiment of the invention provides a power supply unit that is operable to provide power to one or more electronic components. The power supply unit incorporates a detector that is responsive to the power output level from the power supply unit increasing beyond a predetermined limit. Should this occur, an alert signal is transmitted to the electronic component(s) to instruct them to reduce their power consumption. Furthermore, another embodiment of the invention provides an electronic component having a first input for receiving electrical power from a power supply and a second input for receiving a signal from the power supply. The component incorporates a controller, which is responsive to the signal being asserted to reduce power consumption within the electronic component.

In accordance with another embodiment of the invention, there is provided a computer system. The computer system comprises at least one digital electronic semiconductor component and a power supply unit operable to provide direct current (DC) power to the digital electronic semiconductor component. The power supply unit is responsive to its DC power output increasing beyond a predetermined limit to assert a control signal. This control signal is passed to the digital electronic semiconductor component, which is responsive to assertion of the control signal to reduce its power consumption.

In accordance with another embodiment of the invention, there is provided a method of controlling power output in an apparatus comprising at least one electronic component and a power supply unit. The method comprises providing power to one or more electronic components from the power supply unit; detecting within the power supply unit that a power output level from the power supply unit has increased beyond a predetermined limit; responsive to so detecting, transmitting an alert signal to the electronic component(s); and responsive to the alert signal, reducing the power consumption of the electronic component(s).

In accordance with another embodiment of the invention, there is provided a method of controlling power output from a power supply unit. The method comprises providing power to one or more electronic components from the power supply unit; detecting that a power output level from the power supply unit has increased beyond a predetermined limit; and responsive to so detecting, transmitting an alert or delay signal to the electronic component(s) instructing them to reduce their power consumption.

It will be appreciated that such method and computer system embodiments can generally utilise the same particular features as described above in relation to the apparatus embodiments.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 2:
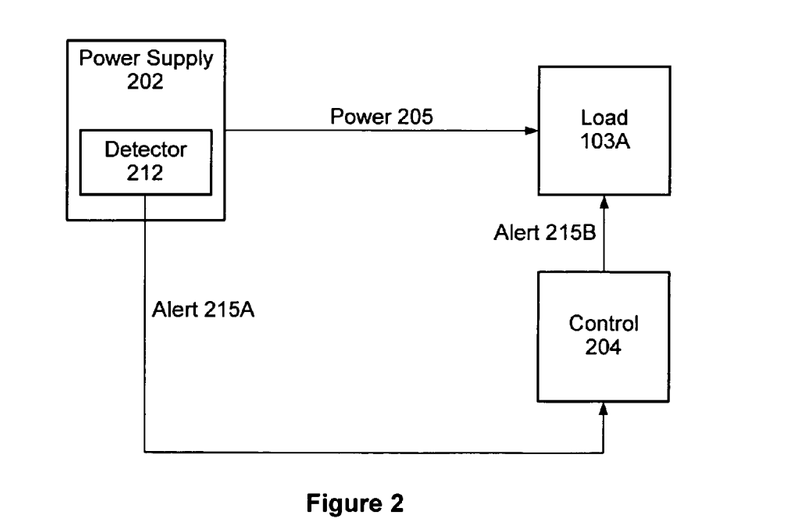
FIG. 2 is a schematic representation of a power supply in a system in accordance with one embodiment of the present invention.

FIG. 2 is a schematic diagram of a power supply configuration in accordance with one embodiment of the present invention. Power supply 202 provides power 205 to load 103. Typically power supply 202 corresponds to DC/DC converter 102 in FIG. 1, but it can also correspond to AC/DC converter 101, or to any other appropriate power supply device.

Included within the power supply 202 is a detector 212 that monitors the power output 205 from the power supply 202 to load 103. Detector 212 triggers when the power output from supply 202 moves towards the top end of the design capabilities of power supply 202. Note that this trigger point is still short of the level at which power supply 202 may be damaged, and at which an automatic cut-out (not shown in FIG. 2) is typically implemented.

If the output from power supply 202 does go beyond this trigger point, then detector 212 asserts an alert signal 215A. This alert signal 215A is passed to control unit 204, which in turn forwards a corresponding alert signal 215B to load 103. (Note that for some implementations or components, the control unit 204 is integrated into the load 103, in which case the separate alert signal 215B becomes redundant). The alert signal 215 causes load 103 to decrease or suspend operations temporarily. This reduces the drain on power supply 202, and so brings the supply 202 back to a more comfortable operating position (in terms of its power output level). Alert signal 215 can then be released, thereby allowing load 103 to resume normal operations.

In general, load 103 reduces its power consumption by delaying or postponing operations. Consequently, if alert 215 is asserted, then throughput of the system will be reduced, but otherwise the situation should be transparent to the user, i.e. processing will continue as normal, apart from perhaps a slight delay. It will be appreciated that this represents a significant advantage over relying exclusively on an automatic cut-out to protect the power supply, since such a power cut-out usually then requires a system re-boot, and may also lead to the loss of data.

It will be appreciated that the power supply 202 is designed so that for the majority of system operations alert signal 215 is not required. In other words power supply 202 generally provides the power required by load 103 without difficulty. However, the inclusion of detector 212 and alert signal 215 now protects the system against rare or unexpected peaks in power demand from load 103. This firstly allows power supply 202 to be designed with less generous margins if so desired (typically to save costs), since excess demand will now simply delay processing somewhat, rather than cause a system crash. Secondly, the system is also protected against the possibility of unexpected surges in power demand leading to cut-out of the power supply, thereby improving overall system robustness and reliability.

Although load 103 is shown in FIG. 2 as a single block, it will be appreciated that a power supply unit 202 may be connected to multiple load devices, for example a CPU, a DRAM, a graphics processor, and so on. The alert signal 215 may then be provided only to a subset of one or more these components, depending upon their particular properties. For example, the alert signal 215 is mainly relevant for those load devices that support a facility to reduce their power consumption. In addition, it is clearly most valuable for the alert signal 215 to be received by those components that draw the most power from the supply 202. Thus if a particular component takes a variable but small amount of power from the supply unit 202, then there is relatively little benefit in incorporating this component into the power regulation mechanism using alert signal 215, since this component by itself is unlikely to overload power supply 202 (or to be able to significantly reduce demand from it).

If multiple load devices are present, there may be a control unit 204 associated with each load device, or a single control unit may serve more than one load device. For example, the power supply 202 may output the alert signal 215A to one control unit 204 that then directs corresponding signals 215B to as many different load devices as necessary.

Note that some load devices may not directly incorporate a facility to reduce power consumption in response to an alert signal 215. Nevertheless, such devices may have some indirect mechanism for achieving the same effect. For example, it may be possible to place a device temporarily in a test mode, whereby it does not respond to processing requests. This may lead to a reduction in power consumption, while at the same time not causing the system to crash (perhaps such requests are simply retried when the test mode is released). In such circumstances, the control unit 204 may then be responsible for transforming the alert signal 215A from the power supply 202 into an appropriate form of control signal(s) 215B for achieving the desired power reduction in the relevant load devices, such as by setting the load device into a test or idle mode, and for subsequently restoring normal operations when the alert signal 215A is released.

In most implementations two separate connections are provided between power supply 202 and load 103, one for carrying the power signal 205 and the other for carrying the alert signal 215. However, it is also possible to use only a single connection if so desired, with the alert signal typically being supplied as an appropriate modulation on top of the power signal 205. This approach then requires suitable modulation and demodulation circuitry in the power supply 202 and the load 103 respectively.

Figure 3:
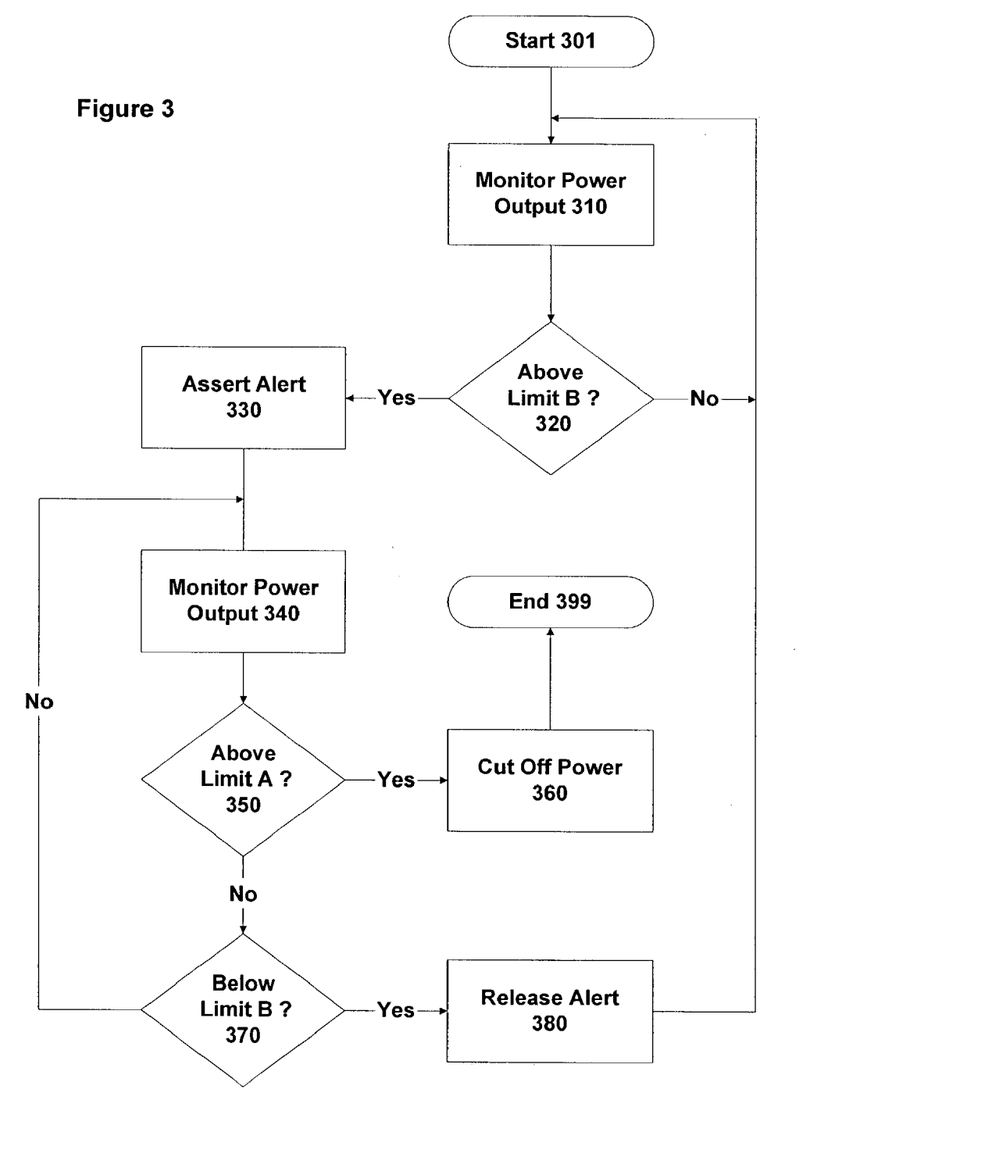
FIG. 3 is a flow-chart illustrating the operation of the power supply from FIG. 2 in accordance with one embodiment of the invention.

FIG. 3 is a flow chart illustrating the power management operations of the system of FIG. 2 in accordance with one embodiment of the invention. After power on (start 301), the power output from the power supply unit is monitored (step 310), such as by detector 212, in order to ensure that it stays within specified limits. In particular, it is assumed in FIG. 3 that two limits are defined for power signal 205, which are referred to herein as Limit A and Limit B. The former corresponds to the point at which the output from the supply becomes dangerously high, whereupon the supply automatically cuts out, in order to prevent damage. The latter corresponds to the point at which alert signal 215 is output (as shown in FIG. 2), so as to reduce power consumption from the power supply unit, i.e. to try to avoid any risk that the output level will reach limit A. Thus limit B is set sufficiently far below limit A in order to provide a suitable safety margin.

Following the monitoring of the power output at step 310, a test is made, e.g. by detector 212, to see whether the power output is above limit B (step 320). If not, then the power supply unit is within its standard operating regime and no particular action is being taken. Rather, normal monitoring of the power output is continued (i.e. back to step 310).

On the other hand, if it is detected that the output from the power supply unit is indeed above limit B, then action is taken to try to reduce the drain on the power supply unit 202. In particular, the alert signal is asserted (step 330) to one or more load devices that drawing power from the power supply unit 202. As previously indicated, these devices respond to the alert signal by reducing their power consumption. This should then allow power supply unit 202 to remain within its safe operating limits.

In order to confirm this, the power signal 205 is further monitored (step 340). If it is found that the power output has continued to increase and is now above limit A (step 350), then output from the supply 202 must be cut off immediately (step 360) in order to protect the system from possible damage. In general, this will lead the system to stop processing (end 399), and require a subsequent reboot. (In systems having multiple redundant power supply units, it may be possible to continue processing operations, provided that the remaining power supply units are still within their acceptable operating parameters).

Assuming on the other hand that the assertion of the alert signal 215 prevents a continued rise in output level from the power supply unit, and so the power signal 205 does not go above limit A, it is also tested to see whether or not the power signal 205 has now fallen back below limit B (step 370). In other words, it is determined whether or not the power supply unit 202 is now being operated again within its standard operating regime. If this is not the case, then monitoring of the output level from the power supply unit continues (back to step 340), and the alert signal remains asserted. Eventually, it is assumed that the power output level does indeed fall below limit B, at which point the alert signal 215 can now be released (step 380). This then returns us to the status of the system just after power on, with the power supply unit in its standard operating regime, and the load 103 functioning normally.

Figure 4:
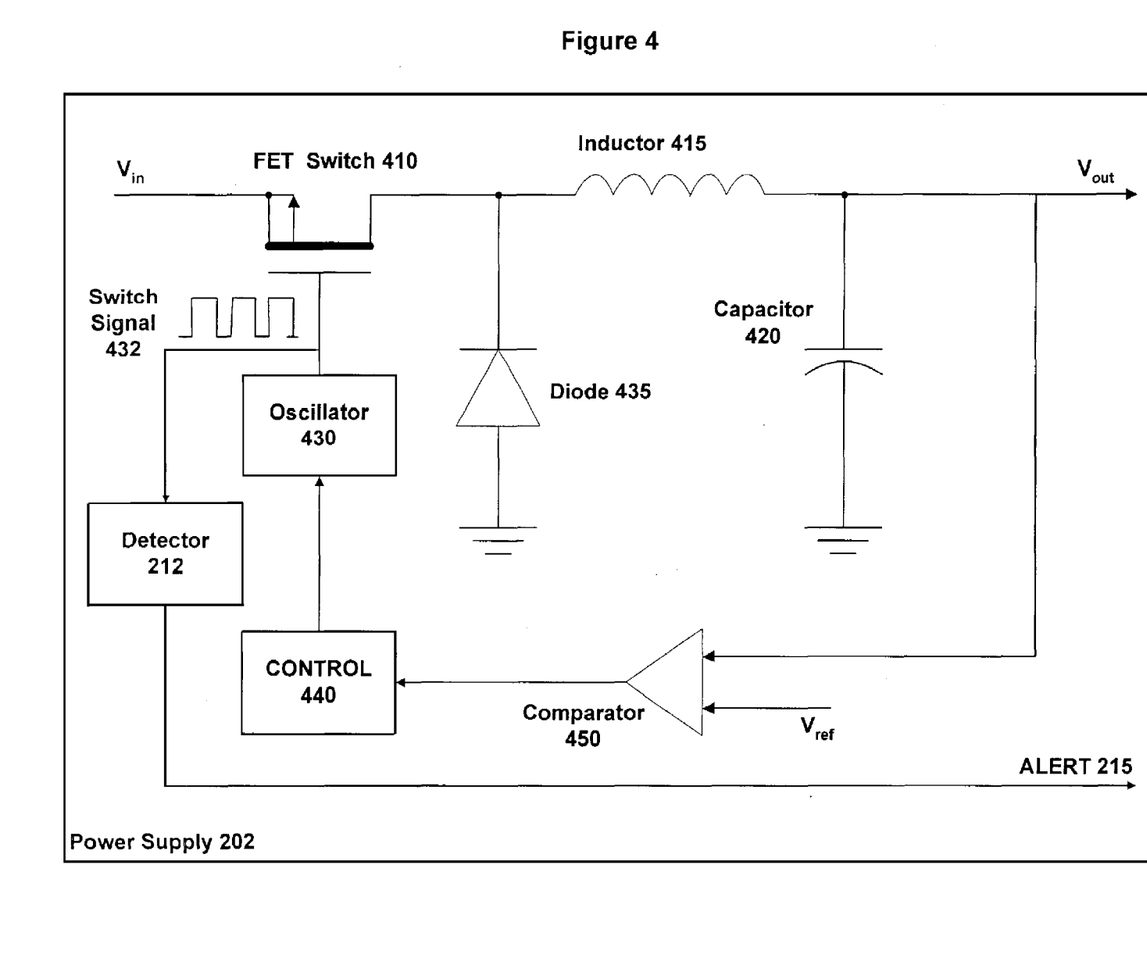
FIG. 4 is a diagram illustrating the configuration of the power supply in the system of FIG. 2 in accordance with one embodiment of the invention.

FIG. 4 shows one example of an embodiment of power supply unit 202, based on a switching regulator. This type of power supply is frequently used in computer systems (for more details see: The Art of Electronics, by P Horovitz and W Hill, Cambridge University Press 1989, ISBN 0-521-37095-7, especially chapter 6).

As shown in FIG. 4, for a switching regulator implementation the power supply 202 is based on a combination of a FET switch 410, a diode 435, an inductor 415, and a capacitor 420. The switch 410 is cycled OFF and ON by a square wave control signal 432 from an oscillator 430. When the switch is closed (i.e. ON), an increasing current is drawn through inductor 415 (assuming that the input voltage, $V_{in}$, is greater than the output voltage, $V_{out}$). This current both supplies the load attached to the power supply 202, and also charges up capacitor 420.

On the other hand, when switch 410 is open (i.e. OFF), the current through inductor 415 declines, but does so gradually (in view of the inductance). At this stage, the voltage on the side of the inductor attached to the (open) switch 410 drops slightly negative, which therefore allows the inductor 415 to pull its continuing current though diode 435. During this phase, the capacitor typically also contributes current to the output from the supply 202. Thus capacitor 420 can be regarded as a form of flywheel that helps to maintain constant output across the different phases of the switch cycle. The larger the capacitor 420, the greater is this smoothing effect.

Power supply 401 also includes a feedback loop, whereby the output voltage, $V_{out}$, is compared to a reference voltage, $V_{ref}$, in a comparator 450. The output of the comparator is then passed to a control unit 440, which in turn controls the operation of an oscillator 430. In particular, if the output voltage starts to fall, for example due to increased power consumption, then the pulse width in the output signal 432 from oscillator 430 is increased, so that switch 410 spends a greater proportion of each cycle in the ON or closed state (alternatively oscillator 430 may maintain a constant pulse width for signal 432, but increase the pulse frequency). Conversely, if $V_{out}$ needs to be lowered to $V_{ref}$, then the oscillator output signal 432 is adjusted in the opposite fashion.

The output signal 432 from oscillator 430 is also received by a detector 212 (corresponding to that shown in FIG. 2). Detector 212 monitors the duty cycle of signal 432 in order to determine if the output of the supply is starting to become too large. Thus it will be appreciated that rising power output from supply 202 will cause oscillator 430 to lengthen the ON phase of each cycle for switch 410. The maximum available power from unit 202 therefore occurs when switch 410 is permanently ON (or the OFF phase is as short as possible). Consequently, detector 212 monitors output signal 432 to determine when the duty cycle is starting to approach unity. At some predefined level, corresponding to limit B in FIG. 3, and representing (for example) an ON phase of 80%, the detector 212 trips and asserts alert signal 215. Conversely, if the duty cycle falls below this limit, then the alert signal 215 is released.

Note that power supply 202 also generally includes an automatic cut-off mechanism (not shown in FIG. 4), which triggers when the power output from supply 202 becomes dangerously high (corresponding to limit A in FIG. 3). As previously explained, this level (i.e. limit A) is somewhat higher than the level at which detector 212 trips (i.e. level B). Note also that although FIG. 3 depicts a single monitoring loop for both limits A and B, in many embodiments the automatic cut-out mechanism will be quite separate and independent from the alert mechanism (albeit that their trigger points are appropriately set in relation to one another). Examples of possible cut-out mechanism are well-known in the art, and are described, for example, in the above-mentioned book by Horowitz and Hill.

As well as smoothing output across the switching cycle, capacitor 420 also serves as a reservoir of charge in case of a sudden increase in power output from supply 202. For example, let us assume that oscillator signal 432 has a frequency of 1 MHz, and that the response time of detector 212 is correspondingly of the order of 1 microsecond. Some of the load on power supply 202 may operate at a much higher frequency, for example, 100 MHz is typical for a DRAM, and 1 GHz is typical for a CPU (for current technology, although naturally these figures are likely to change with time). Consequently, the load may suddenly increase its power demand, and this has to be satisfied for at least the time period before the alert signal 215 can be generated. (There is a further delay to be allowed for, namely the reaction time of the load to reduce its power demand in response to alert signal 215; however, as indicated, many load electronic devices operate at a comparatively high speed, and so this additional delay is likely to be relatively small, and will therefore be ignored).

As an example of the sizing of capacitor 420, let us say that the maximum current output from supply 202 is 5 Amps (at which point the automatic cut-out occurs). This then corresponds to 5 microCoulombs in the 1 microsecond response time for detector 212. Assuming an output voltage ($V_{out}$) of 5 Volts, this then implies that the capacitance of capacitor 420 needs to be at least of the order of 1 microFarad. This should ensure that any sudden peak in power consumption can be satisfied from the charge stored on capacitor 420, at least until detector 212 has time to assert the alert signal 215, and so to reduce demand. (The skilled person will appreciate that this sizing for capacitor 420 only relates to the alert mechanism; it must also be large enough to perform switch cycle smoothing, as discussed above).

Figure 5:
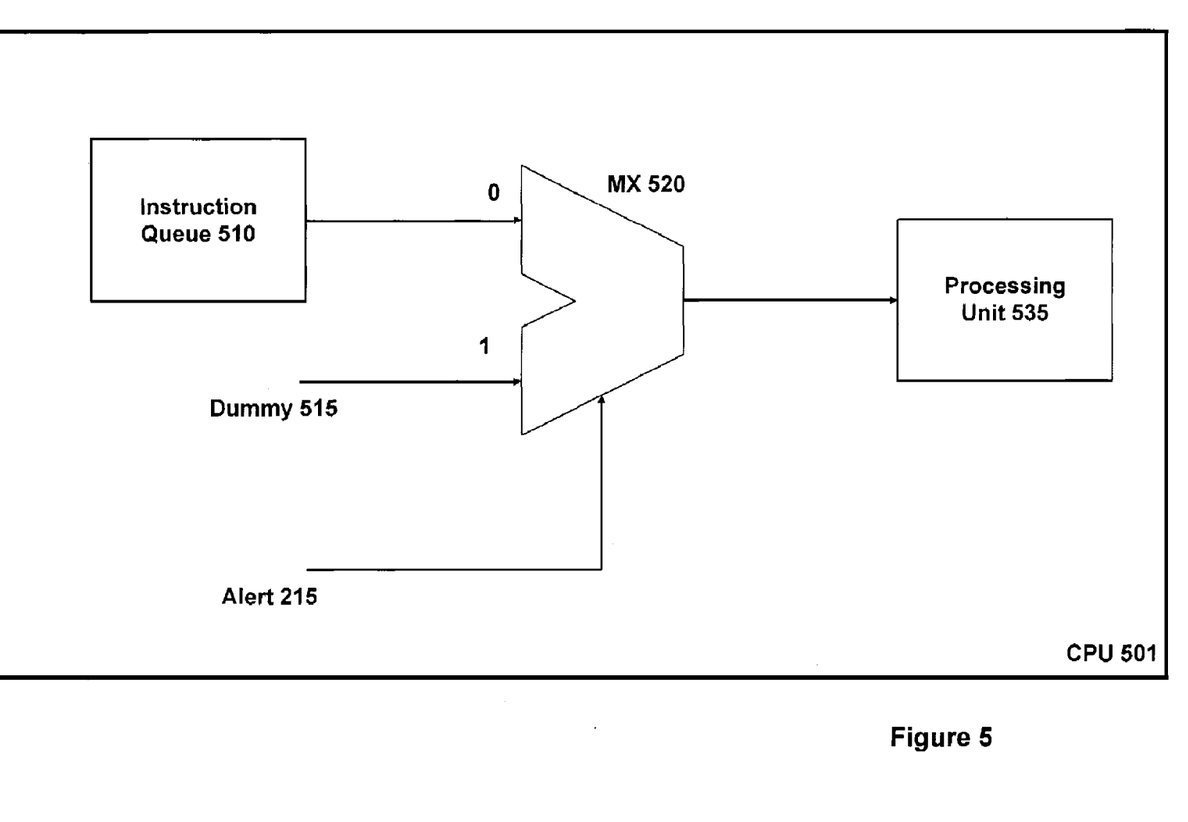
FIG. 5 is a diagram illustrating the configuration of a processor load device in the system of FIG. 2 in accordance with one embodiment of the invention.

FIG. 5 is a schematic diagram depicting one example of how a load device, in this particular case a CPU 501, responds to alert signal 215 in order to reduce its power consumption. Note that CPU 501 responds directly to the alert signal 215 from the power supply 202, so that there is no particular need for an intervening control unit 204, such as shown in FIG. 2. (Note also that only those components of CPU 501 pertinent to an understanding of the present invention are shown in FIG. 5).

In normal operation of the CPU 501, instructions are fed from instruction queue 510 into a processing unit 535 (such as an FPU). In order to implement a power regulation mechanism, multiplexer 520 is inserted into this path. The instruction queue 510 is located on the zero input of the multiplexer 520, while a dummy instruction 515 is located on the one input. (The dummy instruction may be stored in a register or ROM, implemented using hard-wired logic, or provided by any other suitable means). The dummy instruction 515 is such as to occupy one processing cycle of unit 535, but otherwise its leaves unchanged the state of the unit 535 (as regards all the registers, etc.). In addition, the dummy instruction 515 is arranged to require minimal power (this is a natural consequence anyway of the fact that it does not change the state of the CPU).

The selection of multiplexer input is made in accordance with the alert signal 215, where it is assumed that this signal has a value of 0 in its quiescent state, and 1 in its active state. Thus in normal operations, alert signal 215 is not asserted, and unit 535 processes instructions from instruction queue 510. However, if there is a peak in power demand, then the power supply 202 will assert alert signal 215, thereby causing unit 535 to process dummy instructions 515, and so greatly reduce the power consumption of the CPU 501. This will then allow the power supply 202 to release the alert signal 215, and so enable CPU to resume normal operations, in other words, to continue processing instructions from queue 510.

As an example of how the power regulation of FIG. 5 operates, the illustrative values cited above, i.e. a processor speed of 1 GHz and a power supply detector 212 response time of 1 microsecond will again be adopted. Let us also assume that there is a sequence of 1 million instructions, corresponding to 1 millisecond of normal CPU operation, that will produce a surge in the power consumption by CPU 501. In the embodiment of FIG. 5, after approximately the first 1000 of these operations have been performed (corresponding to 1 microsecond of processing), the detector 212 detects and responds to the resulting peak in power demand by asserting the alert signal 215. This then causes the CPU 501 to switch processing to dummy instructions 515, which we will assume require negligibly small power consumption. After approximately a further 1 microsecond, detector 215 responds to the fall in power demand resulting from the processing of the dummy instructions 515, and releases the alert signal 215, thereby allowing CPU 501 to continue processing instructions from queue 510. This then leads in due course to another peak in power demand, causing the alert signal 215 to be reasserted once again.

Continuing in this fashion results in alternating the alert signal every microsecond between an on state, in which dummy instructions 515 are processed, and an off state, in which (genuine) instructions from queue 510 are processed. Thus the genuine instructions are, in effect, broken down into (one thousand) blocks, each of 1000 instructions, with one block being processed during each off state of the alert signal 215. This then continues until all 1 million instructions corresponding to the power surge have been completed (after which it is assumed that any further instructions draw only a normal amount of power, and so do not require power regulation).

As discussed above, capacitor 420 is sized so that it can accommodate or smooth out demand peaks on timescales corresponding to or less than the response time of detector 212. Accordingly, it is appropriate to determine average power demand from power supply 202 by CPU 501 across multiple blocks. If the power required by the CPU 501 to process the sequence of instructions without any power regulation is P, then the above approach reduces the average power consumption to P/2. This is because for 50% of the time (when the dummy instructions 515 are being processed) the power consumption is held at zero. The result therefore is that the peak power consumption has been spread out to one half its original height, but it also now takes twice the duration to process the instruction sequence.

It will be appreciated that the delay from this increased duration should not be too problematic. For example, in the above circumstances, processing the instruction sequence only takes an additional 1 millisecond (i.e. the total time spent with the alert signal 215 in the on state). Provided that surges in power demand are rare, this will not significantly impact overall system performance. On the other hand, if such surges are relatively common, then the power supply will usually be designed to handle them directly, without the need for specific power regulation.

The power regulation mechanism just described is performed within the confines of standard system behaviour. Thus although a power surge may cause the system to experience a temporary delay in processing, the surge is accommodated without any processing errors or failures. This then allows normal operations to continue directly after the power surge has completed. The whole episode is therefore transparent to the user (provided any delay is minor). This represents a significant enhancement over the situation in known systems, where a power surge may trip an automatic cut-out. Such a cut-out typically leads to the system going down, potentially with the loss of data, and then requires a system reboot in order to restart.

Although the power regulation strategy utilised in CPU 501 is relatively basic, more complex or sophisticated mechanisms could be adopted if so desired. For example, rather than releasing the alert signal 215 immediately the power demand falls below the initial trigger point (i.e. limit B in FIG. 3), the detector may wait a predefined period of time before doing so. The introduction of such a delay allows greater smoothing of peak power demands. In other words, the maximum amplitude of any power surge is reduced by spreading the surge out over a longer period of time. Another possible motivation for including a delay is to allow an output capacitor (such as capacitor 420 in FIG. 4) to charge up fully while the alert signal 215 is asserted. This then ensures that the power supply 202 is able to handle properly any continued peak power demand when the alert signal 215 is released.

A further possibility is that the trigger point for releasing the alert signal 215 is set at a lower level than the trigger point for initially asserting it. In other words if alert signal 215 is released at limit C, then limit C may be set below the level of limit B. This also has the effect of temporarily prolonging the on state of the alert signal 215, similar to the introduction of a delay (as just described).

It will be appreciated that there are many possible implementations apart from that shown in FIG. 5 for load devices that respond to the alert signal 215 to reduce power consumption. Typically these will depend upon the particular type of load device in question, for example, CPU, DRAM, ASIC, switch, and so on. Nevertheless, the general underlying approach will normally be similar to that adopted for CPU 501, whereby a surge in power demand is smoothed. Thus operations are delayed or postponed, thereby spreading out power consumption over a longer period and so decreasing maximum (i.e. peak) power demand. In other words, a power surge is reduced or removed by extending the period required to complete the relevant operations.

The skilled person will be aware of how to implement such a strategy in any given load device. For example, if alert signal 215 is asserted into a DRAM, then this may cause a delay of one (memory) cycle to be inserted for each memory access request. In other words, after receiving a memory access request from a system processor (or other source), the DRAM idles or delays for one cycle before responding to the request. Once the alert signal 215 is released, normal operations of the DRAM can resume.

It will be appreciated that introducing such a delay into the DRAM response will not result in any errors or processing failure (for a system in which memory operations are performed asynchronously with respect to the processor clock cycle). Thus the processor may have to wait slightly longer than expected for a memory access request to be satisfied, but otherwise the power regulation is transparent to it (and to the system user). Nevertheless, this approach leads to approximately a 50% reduction in power demand by the DRAM, assuming that the delay cycle itself has negligible power demand.

In the embodiments of FIGS. 4 and 5, the alert signal 215 is provided by a simple binary line that is either active or quiescent. However, in other embodiments, a more complex alert signal 215 may be used. One possibility is that the alert signal has multiple bits that are used to provide an indication of by how much power consumption should be reduced. In other words, the magnitude of the alert signal may relate to the amount by which load devices are required to reduce their power demand: e.g. 00 is no reduction (i.e. the alert signal is released), 01 requests a small reduction, 01 a medium reduction, and 11 the maximum possible reduction.

Corresponding to this, there may also be increased flexibility and/or sophistication in how a load device reacts to the alert signal 215. For example, in the embodiment of FIG. 5, the CPU 501 stops processing instructions from queue 510 altogether if the alert signal 215 is asserted, since in this case only dummy instructions 515 are performed. However, the CPU could be configured to perform a certain percentage of genuine instructions (i.e. from instruction queue 510) even if the alert signal 215 is asserted. This may perhaps be desirable if the high power consumption is due to some other component having a state specified by the processor, since ongoing processing within the CPU may then release the component from this state, and so end the surge in power requirements. Such an approach may also be combined if so desired with having a multi-level alert signal 215, whereby the value of the alert signal is used to determine the proportion of dummy instructions 515 that are inserted into the processing stream for processor unit 535.

A further possible configuration is where the power supply is connected to multiple load devices. In these circumstances, and using a multi-level alert signal, high values of the alert signal may be directed to all of the load devices, whereas low values of the alert signal may be directed to only a subset of these devices. (Typically control unit 204 would be responsible for this functionality). In another embodiment, some form of power monitoring may be implemented within a load device itself. A load device then only responds to an alert signal if, at that particular time, the device is drawing a relatively large amount of power compared to its normal operational level. This may be determined, for example, by testing to see if the present power consumption is greater than some predefined threshold. However, if the device is drawing only its usual amount of power (i.e. it is below the threshold), then the device may not reduce its power consumption in response to the alert signal, or may reduce it by only a more moderate amount. (This may be particularly the case for lower values of a multi-level alert signal). The assumption in this latter case is that some other load device attached to the power supply is responsible for the current surge in demand, and will respond appropriately to the alert signal. One advantage of this approach is that the processing delay can then be localised to the particular component(s) responsible for the surge in power demand, with the remaining component(s) allowed to continue operating in as normal a fashion as possible. Note that in an alternative configuration, the monitoring of the power consumption of load devices may be performed externally to the devices (e.g. by the control unit 204), with the alert signal then being directed to the component(s) that are currently drawing the most significant amounts of power.

It will be appreciated that many known computer systems already incorporate a power conservation facility, whereby idle devices are switched to a state of reduced power consumption. Thus if a computer system is inactive for a predefined period of time, it may go into hibernation. This typically involves shutting down the monitor and putting the hardware and software into a suspended state, pending re-activation of the system. It will be appreciated that such a power conservation facility is very different from the power regulation approach described herein, in that it is triggered by low activity (rather than excessive activity), and also the system in effect stops processing for a prolonged period of time (rather than continuing processing as much as possible, compatible with power supply constraints). Thus these two types of functionality (power conservation and power regulation) are complementary, and if desired can be implemented together in a single system.

In conclusion, although the approach described herein is typically intended for use in a computer system, it is applicable to any electronic system that has a power supply and one or more load devices (especially involving semiconductor digital electronic components). It will be appreciated that this includes not only a wide variety of computing systems (mainframe, server, workstation, desktop, laptop, handheld, etc.), but also a great range of other electronic systems (e.g. telecommunications apparatus, household electronic devices such as televisions and DVD players, subsystems for transport devices such as cars and aeroplanes, and so on).

Thus while a variety of particular embodiments have been described in detail herein, it will be appreciated that this is by way of exemplification only. The skilled person will be aware of many further potential modifications and adaptations that fall within the scope of the claimed invention and its equivalents.

The invention claimed is:

1. An apparatus, comprising:
   at least one electronic component; and
   a power supply unit operable to provide power to the at least one electronic component, said power supply unit having a detector which is responsive to an increase in level of power output from the power supply unit beyond a predetermined limit to initiate transmission of an alert signal to the at least one electronic component, wherein said alert signal is set to one of a plurality of alert values, and wherein said plurality of alert values comprises two or more values each representing a respective alert condition and one value representing a normal condition;
   wherein said at least one electronic component is responsive to the alert signal to reduce its power consumption.

2. The apparatus of claim 1, wherein said alert signal comprises an output signal from the power supply which is changed from a first value to a second value in response to the power output level increasing beyond said predetermined limit.

3. The apparatus of claim 2, wherein said output signal is returned from the second value to the first value in response to the power output level decreasing below the predetermined limit.

4. The apparatus of claim 2, wherein said output signal comprises a binary signal.

5. The apparatus of claim 1, wherein power consumption is reduced by an amount determined according to one of the two or more values to which the alert signal is set.

6. The apparatus of claim 1, further comprising a first line for providing power from the power supply unit to the at least one electronic component, and one or more other lines for providing the alert signal from the power supply unit.

7. The apparatus of claim 6, wherein the alert signal is routed to a control unit, wherein the control unit is responsive to receipt of the alert signal to generate a control signal, and wherein the control signal is operable to control the at least one electronic component to reduce power consumption.

8. The apparatus of claim 1, wherein the power supply unit includes an automatic cut-out mechanism, wherein the automatic cut-out mechanism is independent of the detector, wherein the automatic cut-out mechanism is configured to implement cutting out power from the power supply unit if the power output level exceeds a predetermined cut-out level, and wherein said predetermined cut-out level is greater than said predetermined limit.

9. The apparatus of claim 1, wherein said power supply unit includes an output capacitor having a charge storage capacity matched approximately to:
   (i) a time response of the detector; and
   (ii) a maximum anticipated output power level.

10. The apparatus of claim 1, wherein said power supply unit includes a switching regulator, and wherein said detector measures a duty cycle of the switching regulator in order to determine whether the power output level has increased beyond said predetermined limit.

11. The apparatus of claim 1, wherein said at least one electronic component responds to the alert signal by stopping processing operations.

12. The apparatus of claim 1, wherein said at least one electronic component responds to the alert signal by performing dummy operations.

13. A power supply unit operable to provide power to at least one electronic component, said power supply unit having a detector which is responsive to an increase in level of power output by the power supply unit beyond a predetermined limit to cause transmission of an alert signal to the at least one electronic component to instruct the at least one electronic component to reduce its power consumption; and said power supply unit comprising an automatic cut-out mechanism, wherein the automatic cut-out mechanism is independent of the detector, wherein the automatic cut-out mechanism is configured to implement cutting out power from the power supply unit if the power output level exceeds a predetermined cut-out level, and wherein the predetermined cut-out level is greater than the predetermined limit, said power supply unit further including an output capacitor having a charge storage capacity matched approximately to:
   (i) a time response of the detector; and
   (ii) a maximum anticipated output power level.

14. The power supply unit of claim 13, wherein said alert signal comprises an output signal from the power supply which is changed from a first value to a second value in response to the power output level increasing beyond said predetermined limit.

15. The power supply unit of claim 14, wherein said output signal is returned from the second value to the first value in response to the power output level decreasing below the predetermined limit.

16. The power supply unit of claim 13, further comprising a first output connection for providing power from the power supply unit to the at least one electronic component, and a second output connection for providing the alert signal from the power supply unit.

17. The power supply unit of claim 13, further including a switching regulator, wherein said detector measures a duty cycle of the switching regulator in order to determine whether the power output level has increased beyond said predetermined limit.

18. An electronic component, comprising:
   a first input for receiving electrical power from a power supply;
   a second input for receiving a signal from the power supply, which when asserted instructs the electronic component to reduce power consumption; and
   a controller, which is responsive to said signal being asserted to reduce power consumption within the electronic component;
   wherein said signal is settable to one of a plurality of values, wherein said plurality of values comprises two or more values each representing a respective asserted state and one value representing a deasserted state, and wherein the controller is configured to reduce power consumption by an amount determined according to the respective asserted state when the signal is set to one of the values representing an asserted state.

19. A computer system, comprising:
   at least one digital electronic semiconductor component; and
   a power supply unit operable to provide direct current (DC) power to the at least one digital electronic semiconductor component, wherein said power supply unit is responsive to said provided DC power increasing beyond a predetermined limit to assert a control signal to the at least one digital electronic semiconductor component, wherein the power supply is configured to set the control signal to one of a plurality of values, and wherein said plurality of values comprises two or more values each representing a respective asserted state and one value representing a deasserted state;

wherein said at least one electronic component is responsive to assertion of the control signal to reduce its power consumption by an amount determined according to the one of the two or more values representing an asserted state to which the control signal is set.

20. The computer system of claim 19, wherein said power supply unit comprises a DC/DC converter.

21. The computer system of claim 19, wherein said at least one digital electronic semiconductor component comprises a processor.

22. The computer system of claim 21, wherein said processor responds to assertion of the control signal by performing dummy operations.

23. The computer system of claim 19, wherein said at least one digital electronic semiconductor component comprises random access memory (RAM), and wherein the control signal is routed to a control unit that is responsive to receipt of the control signal to reduce power consumption in the RAM.

24. The computer system of claim 19, wherein the power supply unit includes an automatic cut-out mechanism, wherein the automatic cut-out mechanism is independent of a mechanism for detection of said provided DC power increasing beyond a predetermined limit, wherein said automatic cut-out mechanism is configured to implement cutting out power from the power supply unit if the power output level exceeds a predetermined cut-out level, wherein said predetermined cut-out level is greater than said predetermined limit.

25. The computer system of claim 19, wherein said power supply unit includes an output capacitor having a charge storage capacity matched approximately to:
  (i) a time response of the detector; and
  (ii) a maximum anticipated output power drain.

26. The computer system of claim 19, wherein said power supply unit includes a switching regulator, and wherein said detector measures a duty cycle of the switching regulator in order to determine whether the power output level has increased beyond said predetermined limit.

27. A method of controlling power output in an apparatus comprising at least one electronic component and a power supply unit, said method comprising:
  providing power to the at least one electronic component from the power supply unit;
  detecting within the power supply unit that a power output level from the power supply unit has increased beyond a predetermined limit;
  responsive to so detecting, transmitting an alert signal to the at least one electronic component, wherein said alert signal is set to one of a plurality of values according to the power output level, and wherein said plurality of alert values comprises two or more values each representing a respective alert condition and one value representing a normal condition; and
  responsive to the alert signal, reducing the power consumption of the at least one electronic component by an amount determined according to the one of the two or more values representing an alert condition to which the alert signal is set.

28. The method of claim 27, wherein transmitting said alert signal comprises changing an output signal from the power supply from a first value to a second value in response to the power output level increasing beyond said predetermined limit.

29. The method of claim 28, further comprising returning the output signal from the second value to the first value in response to the power output level decreasing below the predetermined limit.

30. The method of claim 27, wherein power is provided from the power supply unit to the at least one electronic component over a first line, and the alert signal is provided from the power supply unit over a second line.

31. The method of claim 27, further comprising automatically cutting out power from the power supply unit if the power output level exceeds a second predetermined limit, wherein said automatically cutting out power is independent of said detecting.

32. The method of claim 27, further comprising the at least one electronic component responding to the alert signal by stopping processing operations.

33. The method of claim 27, further comprising the at least one electronic component responding to the alert signal by performing dummy operations.

34. The method of claim 27, wherein said apparatus comprises a computer system, and said at least one electronic component comprises a digital semiconductor device.

35. A method of controlling power output from a power supply unit, said method comprising:
  providing power to at least one electronic component from the power supply unit;
  detecting that a power output level from the power supply unit has increased beyond a predetermined limit; and
  responsive to so detecting, transmitting an alert signal to the at least one electronic component instructing it to reduce power consumption, wherein said alert signal is set to one of a plurality of values according to the power output level, and wherein said plurality of alert values comprises two or more values each representing a respective alert condition and one value representing a normal condition.

36. An apparatus, comprising:
  means for supplying power to at least one electronic component;
  means for detecting that a power output level from the power supply unit has increased beyond a predetermined limit;
  means responsive to the detecting means for transmitting a delay signal to the at least one electronic component instructing it to reduce power consumption;
  means for storing a charge matched approximately to:
    (i) a time response of the detecting means; and
    (ii) a maximum anticipated output power level; and
  means for automatically cutting out power from the power supply unit if the power output level exceeds a predetermined cut-out level, wherein said means for automatically cutting out power is independent of said means for detecting that a power output level from the power supply unit has increased beyond a predetermined limit.

* * * * *